US008570142B2

(12) United States Patent
Tada

(10) Patent No.: US 8,570,142 B2
(45) Date of Patent: Oct. 29, 2013

(54) FACILITIES CONTROLLING SYSTEM AND METHOD

(75) Inventor: Tomoyuki Tada, Tokyo (JP)

(73) Assignee: Azbil Corporation, Tokyo (JP)

( * ) Notice: Subject to any disclaimer, the term of this patent is extended or adjusted under 35 U.S.C. 154(b) by 217 days.

(21) Appl. No.: 13/236,986

(22) Filed: Sep. 20, 2011

(65) Prior Publication Data

US 2012/0075055 A1 Mar. 29, 2012

(30) Foreign Application Priority Data

Sep. 27, 2010 (JP) ................................ 2010-214858

(51) Int. Cl.
*G06F 7/40* (2006.01)

(52) U.S. Cl.
USPC ........................................................ 340/5.2

(58) Field of Classification Search
USPC ............ 340/5.2, 5.21, 5.22, 5.23, 5.24, 5.27, 340/5.3, 5.33, 5.6, 5.61, 5.64, 5.7, 5.8, 340/539.1, 539.13, 8.1, 10.1, 10.5, 10.51
See application file for complete search history.

(56) References Cited

U.S. PATENT DOCUMENTS

| | | | | |
|---|---|---|---|---|
| 8,294,550 | B2 * | 10/2012 | Sasakuma | 340/5.2 |
| 2007/0078782 | A1 * | 4/2007 | Ono et al. | 705/67 |
| 2010/0045424 | A1 * | 2/2010 | Kawakita | 340/5.2 |
| 2012/0032775 | A1 * | 2/2012 | Kikuchi | 340/5.2 |
| 2012/0044047 | A1 * | 2/2012 | Morgan | 340/5.2 |

FOREIGN PATENT DOCUMENTS

JP 10-280752 A 10/1998

* cited by examiner

*Primary Examiner* — Nabil Syed
(74) *Attorney, Agent, or Firm* — Troutman Sanders LLP

(57) ABSTRACT

An evaluation processing portion changes a user level of a user, in a user level storing portion, to a value that is equal to a region level when an evaluation result indicates that entry is authorized.

2 Claims, 6 Drawing Sheets

FIG. 2

| Region ID | Region Level | Door ID |
|---|---|---|
| R1 | 1 | D1 |
| R2 | 2 | D2 |
| R3 | 3 | D3 |
| R4 | 3 | D4 |
| R5 | 2 | D5 |
| R6 | 1 | D6 |
| Etc. | | |

FIG. 3

| User ID | User Level |
|---|---|
| 001 | 0 |
| 002 | 0 |
| 003 | 0 |
| Etc. | |

| Region ID | Region Level | Door ID | Initializing Point Flag |
|---|---|---|---|
| R1 | 1 | D1 | 0 |
| R2 | 2 | D2 | 1 |
| R3 | 3 | D3 | 0 |
| R4 | 3 | D4 | 0 |
| R5 | 2 | D5 | 0 |
| R6 | 1 | D6 | 0 |
| Etc. | | | |

FACILITIES CONTROLLING SYSTEM AND METHOD

CROSS REFERENCE TO RELATED APPLICATIONS

The present application claims priority under 35 U.S.C. §119 to Japanese Patent Application No. 2010-214858, filed Sep. 27, 2010, which is incorporated herein by reference.

FIELD OF TECHNOLOGY

The present invention relates to a facilities controlling technology, and, in particular, to a facilities controlling technology wherein entry evaluations will change depending on the entry/exit histories of users.

BACKGROUND OF THE INVENTION

In a facilities controlling system for controlling entry/exit of users using a plurality of regions provided in a facility, recording media, such as ID cards, recorded with individual identification numbers for identification of individuals, are distributed in advance to users, and when a user enters any given region, an evaluation is made as to whether or not the entry/exit by the user is authorized, based on the individual identification number, which is read from the ID card by a reader terminal, such as a card reader, placed at the entrance/exit of the region, when a user is entering or exiting any given region, where an electric lock that is provided on a door of the region is unlocked depending on the evaluation that entry/exit is authorized (See, for example, Japanese Unexamined Patent Application Publication H10-280752).

Moreover, in this type of facilities controlling system, the entry/exit authorization is evaluated for the user for individual regions by not only providing multiple levels of security as standards expressing the strength of security for the individual regions, but also by applying multiple security levels to individual users as well, and comparing these security levels to evaluate in detail entrances/exits for the individual regions.

In this type of facilities controlling system, normally even those users that are able to enter into controlled regions wherein entrance by users is controlled, once the user has entered into a particular region, one may wish to deny entry into a controlled region thereafter. For example, if a user has entered into a biological laboratory that handles a specific type of organism, entry into a biological laboratory that handles a different type of organism may be prohibited. Moreover, when a user has entered into a radioactive room that handles radiation, entry into a controlled region may be prohibited.

Consequently, in such a case it may be necessary to change, temporarily, the security level of the user. However, in this type of conventional technology, the relationship between the security levels of the individual regions and the security levels assigned to the users have been set statically in advance through a setting operation by a system administrator, and thus there is a problem in that the entry evaluations for a user cannot be modified flexibly.

The present invention is to solve this type of problem, and the object thereof is to provide a facilities controlling technology wherein the user level of a user can be changed dynamically depending on the route of the user who has moved between the individual regions.

SUMMARY OF THE INVENTION

In order to achieve the aforementioned object, the facilities controlling system according to the present invention is a facilities controlling system for performing an entrance authorization evaluation for a user into a region by comparing a region level, which indicates the level of security for a region that is provided in the facility, and a user level, which indicates the level of security for a user that uses the region, including a region level storing portion for storing a region level for each region for which entry is controlled; a user level storing portion for storing a user level for each user that uses the region; a reader terminal, provided in each region, for sending an evaluation request for requesting an entry authorization evaluation for the user for the region in response to a user operation; and an evaluation processing portion for evaluating entry authorization of the user for the region, through comparing, in response to an evaluation request from a reader terminal, the region level of the region, obtained from the region level storing portion, and the user level of the user, obtained from the user level storing portion, and for directing, based on the evaluation result, the locking or unlocking of an electric lock that is provided at the region, wherein: the evaluation processing portion changes the user level of the user, in the user level storing portion, to a value that is equal to the region level when the evaluation result indicates that entry is authorized.

At this time, the region level storing portion may store, in advance, an initialization point, among the regions, wherein the user level of the user is changed to a non-controlled level; and the evaluation processing portion may evaluate, at the time of entrance, that entrance into all regions should be authorized if the user level is the non-controlled level, and changes the user level of the user, in the user level storing portion, to the non-controlled level if the evaluation result is that entry is authorized and the region is an initialization point.

In order to achieve the aforementioned object, the facilities controlling method is a facilities controlling method used in a facilities controlling system for performing an entrance authorization evaluation for a user into a region by comparing a region level, which indicates the level of security for a region that is provided in the facility, and a user level, which indicates the level of security for a user that uses the region, having a region level storing step wherein a region level storing portion stores a region level for each region for which entry is controlled; a user level storing step wherein a user level storing portion stores a user level for each user who uses the region; an operating step wherein a reader terminal, provided in each region, sends an evaluation request for requesting an entry authorization evaluation for the user for the region in response to a user operation; and an evaluation processing step wherein an evaluation processing portion evaluates entry authorization of the user for the region, through comparing, in response to an evaluation request from a reader terminal, the region level of the region, obtained from the region level storing portion, and the user level of the user, obtained from the user level storing portion, and directs, based on the evaluation result, the locking or unlocking of an electric lock that is provided at the region, wherein: the evaluation processing portion step the user level of the user, in the user level storing portion, to a value that is equal to the region level when the evaluation result indicates that entry is authorized.

At this time, the region level storing step may store, in advance, an initialization point, among the regions, wherein the user level of the user is changed to a non-controlled level; and the evaluation processing step may evaluate, at the time of entrance, that entrance into all regions should be authorized if the user level is the non-controlled level, and changes the user level of the user, in the user level storing portion, to the non-controlled level if the evaluation result is that entry is authorized and the region is an initialization point.

The present examples make it possible to change dynamically a user level of a user depending on the route of a user who has moved between individual regions. Doing so makes it possible to change the authorization for entry into a controlled region, for which user entry is limited, in accordance with whether or not the user has entered into a particular region, making it possible to achieve extremely flexible entry evaluations.

BRIEF DESCRIPTION OF THE DRAWINGS

FIG. 2 is a structural example of region information according to an example.

FIG. 3 is a structural example of user information according to the example.

DETAILED DESCRIPTION OF THE INVENTION

Forms for carrying out the present example are explained next in reference to the figures.

Figure 1:
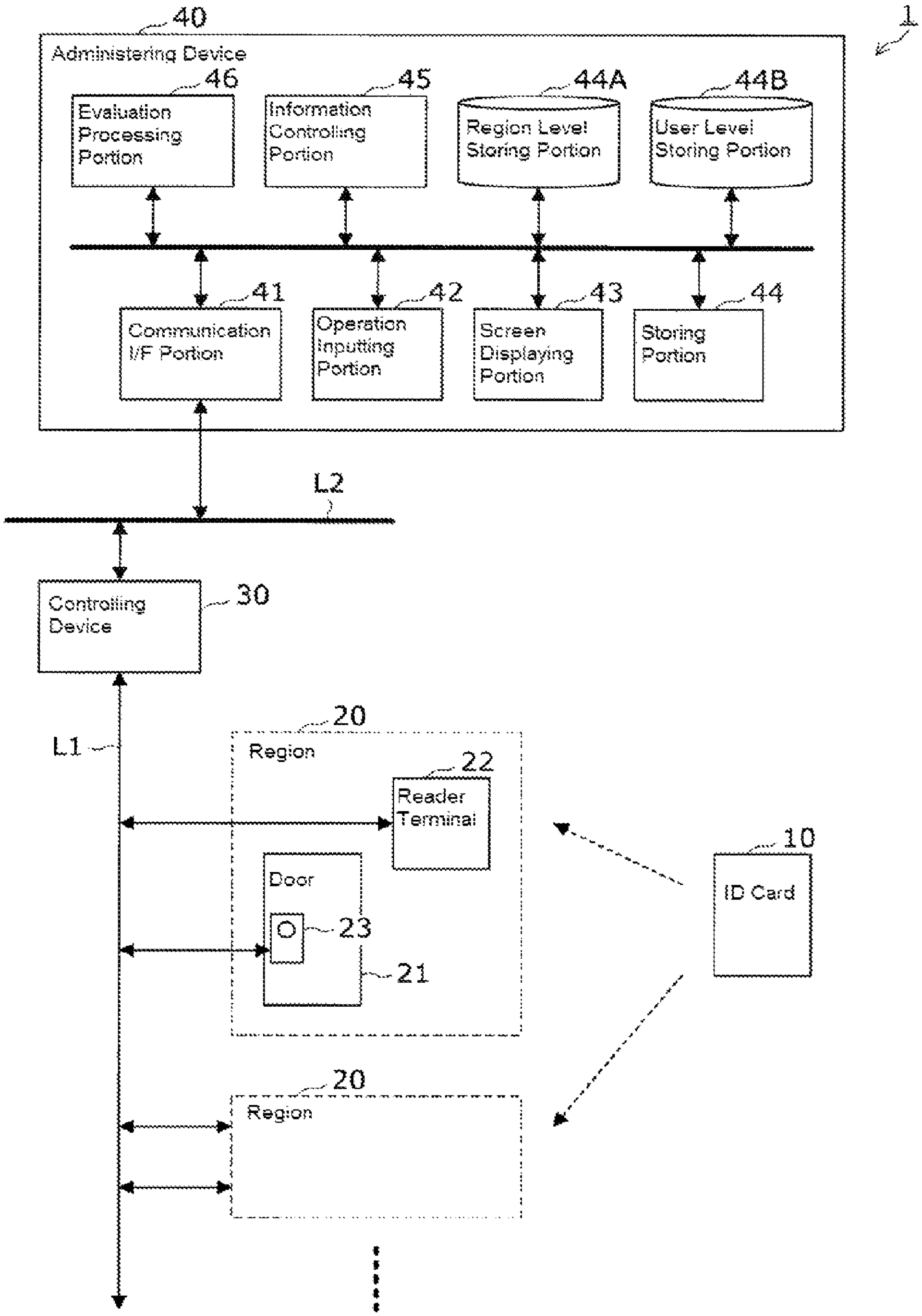
FIG. 1 is a block diagram illustrating a structure of an facilities controlling system.

First of all, an facilities controlling system according to an example is explained in reference to FIG. 1. FIG. 1 is a block diagram illustrating a structure of a facilities controlling system according to an example.

The facilities controlling system 1 includes: an ID card 10, a reader terminal 22, and electric lock 23, a controlling device 30, and an administering device 40. The reader terminal 22 and the electric lock 23 that are provided for the door 21 of each region 20 are connected to the controlling device 30 through a communication circuit L1 so as to be able to exchange data. Moreover, the administering device 40 is connected through a communication circuit L2 so as to be able to exchange data with the controlling device 30. In this case, a plurality of controlling devices 30 may be provided, depending on the scope of the facilities controlling system.

The ID card 10 includes a mobile card for data processing, such as a memory card or an IC card, and has a function for recording user identification information, such as a user ID that is permanent for the user, as information required for evaluating whether or not the user who has the ID card is allowed to pass.

The reader terminal 22 includes a card processing device such as a card reader, provided in parallel with each door 21 of a region 20, and having a function for reading user identification information, such as a user ID, from the ID card 10 presented by the user, through inserting the card into a card slot (contact type) or through holding the ID card up to a card antenna (non-contact type), and a function for sending, through the communication circuit L1 to the controlling device 30, and evaluation request that includes the user identification information and a door ID that is unique to the applicable door 21 and that is set locally in advance.

The electric lock 23 has a function for performing unlocking/locking of a door 21 in accordance with an instruction for unlocking/locking from the controlling device 30, received through the communication circuit and has an electrically actuated lock, and is provided for each door 21 of a region 20. Note that the electric lock 23 is usually locked, and is unlocked for only a specific period of time when an unlock instruction arrives from the controlling device 30.

The controlling device 30 includes a limiting device such as a controller, use in various types of control systems that perform control and monitoring of facilities and is provided with a function for receiving, through the communication circuit L1, evaluation requests from the reader terminals 22 that are provided at each of the regions 20 and for reporting to the administering device 40 through the communication circuit L2, and a function for controlling the electric lock 23, which is provided at the door 21 of the corresponding region 20, in response to an instruction from the administering device 40.

The administering device 40 is, overall, an information processing device such as a server device or a PC, and has a function for evaluating the entry/exit authorization of the user for the particular region, in accordance with the evaluation request from the reader terminal 22 through the controlling device 30, to perform unlock control of the doors of the various regions.

As the main functional portions, the administering device 40 is provided with an I/F portion 41, an operation inputting portion 42, a screen displaying portion 43, a storing portion 44, a region level storing portion 44A, a user level storing portion 44B, an information controlling portion 45, and an evaluation processing portion 46, where these functional portions are connected to each other through an internal bus so as to enable the exchange of data.

The communication I/F portion 41 has the function of performing data communication with the external devices, such as the controlling device 30, through a communication circuit L2.

The operation inputting portion 42 is made from an operation inputting device, such as a keyboard or a mouse, and has a function for detecting operations by an operator and outputting them to various types of functional portions, such as the information controlling portion 45.

The screen displaying portion 43 is made from a screen displaying device, such as an LCD or a PDP, and has a function for displaying on a screen various types of information outputted from various types of functional portions, such as the information processing portion 45.

The storing portion 44 has a storage device such as a memory or a hard disk, and has a function for storing the various types of data and programs used in the processing operations by the administering device 40.

The region level storing portion 44A is a storing device, such as a memory or a hard disk, that is a storing portion for storing, as region information for each of the regions 20 for which entry/exit is controlled, a combination of a region ID for identifying the region and a region level that indicates the level of security for the region 20.

FIG. 2 is a structural example of region information according to the example. Here a combination of the region ID, the region level, and the door ID of the door 21 that is provided at the region 20 is stored for each region 20. In the present example, higher values for the region levels indicate regions wherein the security is stricter.

The user level storing portion 4413 is a storing device, such as a memory or a hard disk, that is a storing portion for storing, for each of the users of the regions 20, a combination of a user ID for identifying the user and a user level that indicates the level of security for the user.

FIG. 3 is a structural example of user information according to the example. Here a combination of the user ID and the user level is stored for each user. In the present example, higher values for user levels are authorized for entry into regions 20 with stricter levels of security, where the default value for each user level is set to "0", indicating a non-controlled level wherein entry is authorized into regions 20 of all region levels.

The information controlling portion 45 is structured from a calculation processing portion wherein a CPU and a program work together cooperatively, and has a function for changing and storing region information that is stored in the region level storing portion 44A in accordance with region information changing operations by an operator through the operation inputting portion 42, and a function for changing and storing user information that is stored in the user level storing portion 44B in accordance with user information changing operations by an operator through the operation inputting portion 42.

The evaluation processing portion 46 is structured from a calculation processing portion wherein a CPU and a program work together cooperatively, and has a function for comparing, in response to an evaluation request from a reader terminal 22, received through the controlling device 30 and the communication I/F portion 41, the region level of the applicable region 20, obtained from the region level storing portion 44A based on the door ID specified in the evaluation request, and the user level, obtained from the user level storing portion 44B based on the user ID specified in the evaluation request, to evaluate the authorization of entry into the region 20 for the user in accordance with the comparison results, and a function for directing the electric lock 23 of the region 20, from the communication I/F portion 41 and through the controlling device 30, to unlock the door, depending on the entry authorization evaluation result.

Figure 4:
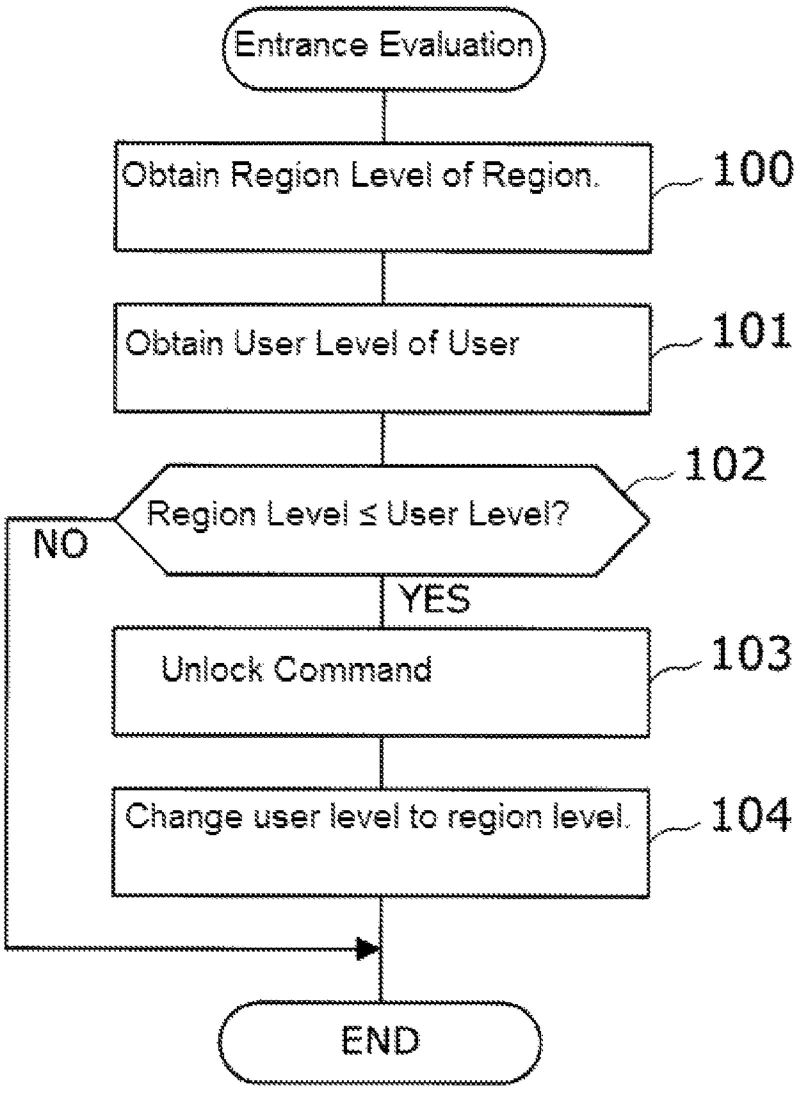
FIG. 4 is a flowchart illustrating the entry evaluation operation of the facilities controlling system according to the example.

The entry evaluation operations of the facilities controlling system according to the present example are explained next in reference to FIG. 4. FIG. 4 is a flowchart illustrating the entry evaluation operation of the facilities controlling system according to the example.

The evaluation processing portion 46 of the administering device 40 performs the entry evaluation processes of FIG. 4 in response to an evaluation request from a reader terminal 22, received by the communication I/F portion 41 through the controlling device 30.

First the evaluation processing portion 46 receives, from the region level storing portion 44A, the region level of the region 20 corresponding to the door ID, based on the door ID that is included in the evaluation request that has been received (Step 100), and receives, from the user level storing portion 44B, the user level of the applicable user, based on the user ID that is included in the evaluation request that has been received (Step 101).

Following this, the evaluation processing portion 46 compares the region level and the user level (Step 102), and if the user level is lower than the region level (Step 102: NO), then the evaluation processing portion 46 evaluates that entry of the user into the region 20 is not permitted, and the series of entry evaluating processes is terminated. Doing so causes the electric lock 23 of the corresponding door 21 to remain locked, so that the user is unable to enter into the region 20.

On the other hand, if the user level is at least as high as the region level (Step 102: YES), then the evaluation processing portion 46 evaluates that the entry by the user into the region 20 is authorized, and sends an unlock instruction from the communication I/F portion 41 through the controlling device 30 to the electric lock 23 of the corresponding door 21 (Step 103). Doing so causes the electric lock of the door 21 to be unlocked, so that the user is able to enter into the region 20.

Following this, the evaluation processing portion 46 changes the user level of the user ID, in the user level storing portion 44B, to a value that equals the region level of the given region 20 (Step 104), and the series of entry evaluating processes is terminated. Doing so changes the user level to a level that is equal to the region level of the region 20 into which the user entered, and thus, thereafter, in the evaluation of an entry into another region, entry into a region of a higher region levels than that of the region 20 is prohibited.

Figures 5, 6:
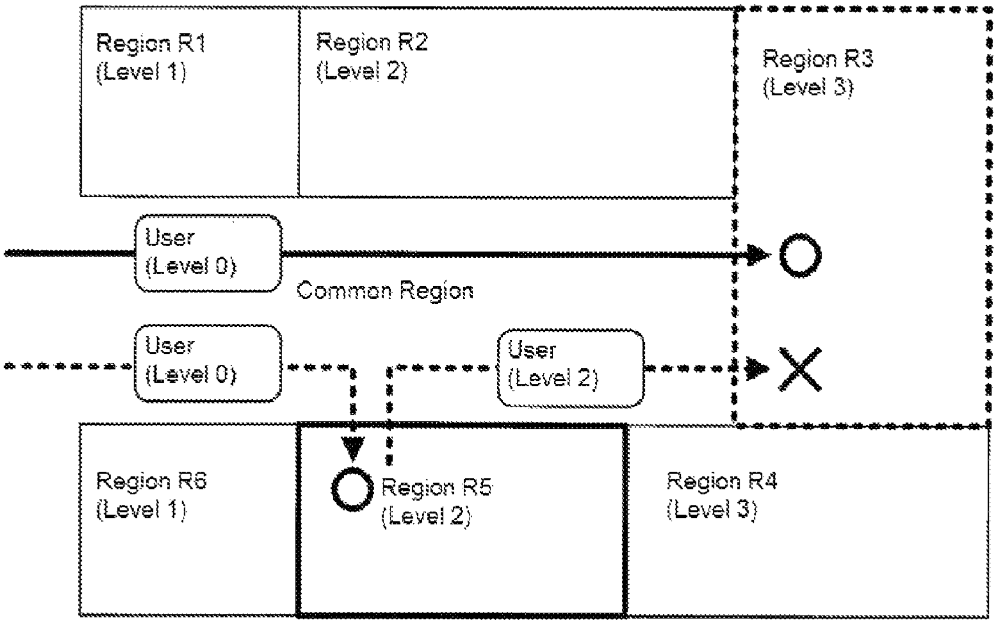
FIG. 5 is an explanatory diagram illustrating an example entry evaluation operation of the facilities controlling system according to the example.
FIG. 6 is a structural example of region information according to another example.

An example of the entry evaluation operations of the facilities controlling system according to the present example is explained next in reference to FIG. 5. FIG. 5 is an explanatory diagram illustrating an example of the entry evaluation operation of the facilities controlling system according to the example.

In the example in FIG. 5, six regions 20, having regions R1 through R6, are provided within the facility, in contact with a common region. As is illustrated in FIG. 2, described above, these regions R1 through R6 are provided in advance with region levels, where level 1 is set for regions R1 and R6, level 2 is set for regions R2 and R5, and level 3 is set for regions R3 and R4.

The case of a user entering into region R3 from the common region is explained first. In the state before entering into the region R3, if the user level of the user is initialized to level 0, which is the non-controlled level, then the evaluation is that entry is authorized in the evaluation of entry into region R3. This enables the user to enter into region R3.

The case of a user entering into region R3 after having entered into the region R5 from the common region is explained next. Because, at this time, in order to prohibit entry into the region R3 of a user that has exited the region R5, the region level of the region R3 is set to a higher-level, 3, than the region level 2 of the region R5.

First, in the state before entering into the region R5, if the user level of the user is initialized to level 0, which is the non-controlled level, then the evaluation will be that entry is authorized in the evaluation of entry into region R5. This enables the user to enter into region R5.

In accordance with the entrance into this region R5, the user level of the user is changed from level 0 to level 2, which is the region level of the region R5. Consequently, thereafter, when the user exits from the region R5 into the common region and then attempts to enter into the region R3, the user level of the user has been changed to level 2, and thus entry into the region R3, which has the region level 3, is prohibited.

In this way, in the present example if the entry authorization evaluation result from the evaluation processing portion 46 indicates that entry is authorized, then the user level for the user is changed to a value that is equal to the region level of the applicable region 20 in user level storing portion 44B, thus making it possible to change the user level of the user dynamically in accordance with the route of the user who is moving between the individual regions 20.

Doing so makes it possible to change the authorization for entry into a controlled region, for which user entry is limited, in accordance with whether or not the user has entered into a particular region, making it possible to achieve extremely flexible entry evaluations.

Consequently, in the example in FIG. 5, if region R5 is a special region that is a biological laboratory that handles special organisms, or a radiation room that handles radiation, or the like, and region R3 is a controlled region wherein entry of users is controlled, then those users who have not entered into the special region can be authorized to enter into the controlled region, but those users who have entered into the special region can be prohibited from entering into the controlled region.

Moreover, while in the present example, the explanation was for a case wherein the user level of the user is changed dynamically in accordance with the route of the user in the administering device 40, it may instead be executed in another device that is provided within the facilities controlling system 1, such as the controlling device 30. For example, the functional portions that are required in the administering device 40, such as the evaluation processing portion 46, may be provided in the controlling devices 30, and the region level information can be deployed from the administering device 40 to the controlling devices 30 in advance, and changes in user levels can be shared through communication within the system, to enable dynamic changes of the user levels by the controlling devices 30.

A facilities controlling system according to another example is explained next.

In the above example, a case was explained wherein the user level of a user was changed to a level equal to the region level of a region 20 in accordance with an evaluation that authorizes entry into the region 20. In the present example, the explanation is for a case wherein a changed user level is initialized.

In the present example, the region level storing portion 44A stores, in advance, an initialization point, among the regions, wherein the user level of the user is changed to a non-controlled level.

FIG. 6 is a structural example of region information according to the second form of embodiment. Here a combination of the region ID, the region level, the door ID, and an initialization point flag that indicates whether or not the applicable region is an initialization point is stored for each region 20. In the initialization point flag, a value of "1" indicates that the applicable region is an initialization point, and a value of "0" indicates that the applicable region is not an initialization point.

The evaluation processing portion 46 has a function for evaluating, at the time of entrance, that entrance into all regions should be authorized if the user level is the non-controlled level, and a function for changing the user level of the user, in the user level storing portion 44B, to the non-controlled level if the evaluation result is that entry is authorized and the region is an initialization point.

The other structures of the facilities controlling system according to the present example are identical to those in the previous example, and thus detailed explanations thereof are omitted.

Figure 7:
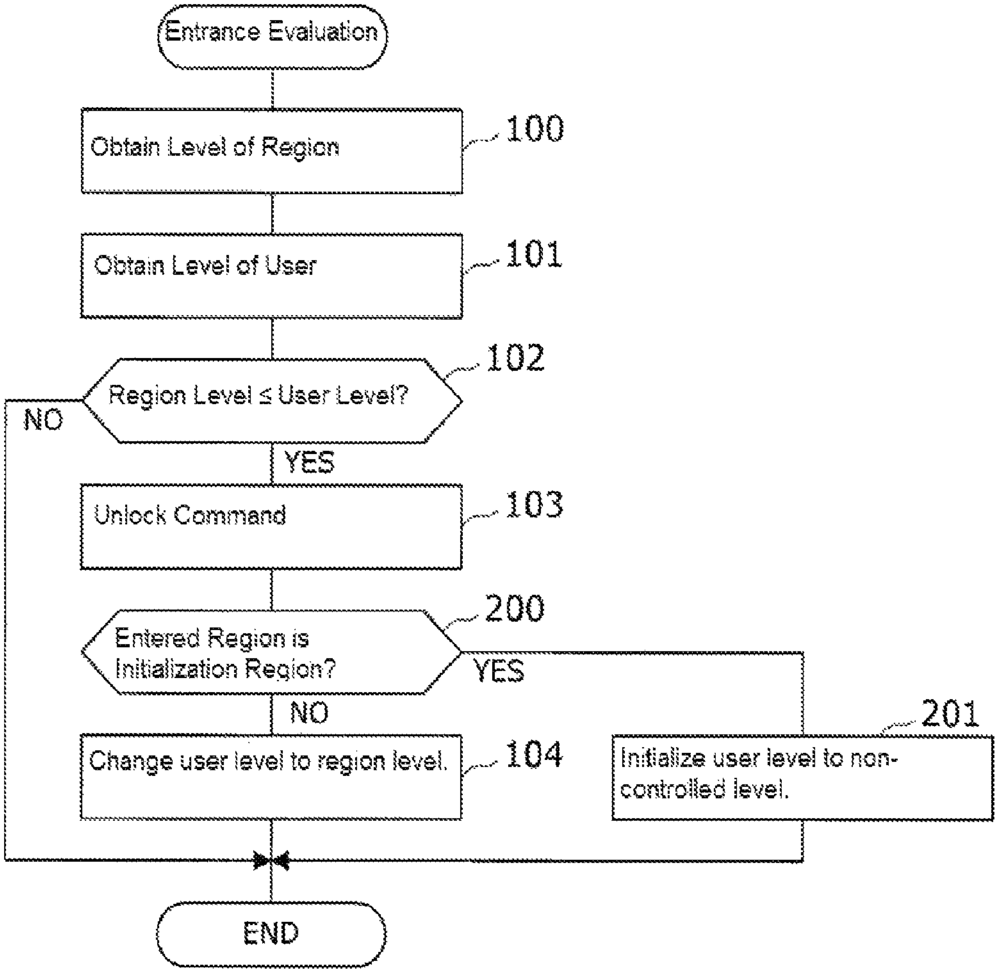
FIG. 7 is a flowchart illustrating the entry evaluation operation of the facilities controlling system according to the other example.

The entry evaluation operations of the facilities controlling system according to the present example are explained next in reference to FIG. 7. FIG. 7 is a flowchart illustrating the entry evaluation operation of the facilities controlling system according to another example, where those parts that are similar or identical to those in FIG. 4, described above, are assigned identical codes.

The evaluation processing portion 46 of the administering device 40 performs the entry evaluation processes of FIG. 7 in response to an evaluation request from a reader terminal 22, received by the communication I/F portion 41 through the controlling device 30.

First the evaluation processing portion 46 receives, from the region level storing portion 44A, the region level of the region 20 corresponding to the door ID, based on the door ID that is included in the evaluation request that has been received (Step 100), and receives the user level of the applicable user, based on the user ID that is included in the evaluation request that has been received (Step 101).

Following this, the evaluation processing portion 46 compares the region level and the user level (Step 102), and if the user level is lower than the region level (Step 102: NO), then the evaluation processing portion 46 evaluates that entry of the user into the region 20 is not permitted, and the series of entry evaluating processes is terminated. Doing so causes the electric lock 23 of the corresponding door 21 to remain locked, so that the user is unable to enter into the region 20.

On the other hand, if the user level is at least as high as the region level (Step 102: YES), then the evaluation processing portion 46 evaluates that the entry by the user into the region 20 is authorized, and sends an unlock instruction from the communication I/F portion 41 through the controlling device 30 to the electric lock 23 of the corresponding door 21 (Step 103). Doing so causes the electric lock of the door 21 to be unlocked, so that the user is able to enter into the region 20.

Following this, the evaluation processing portion 46 references the initialization point flags of the region level storing portion 44A to evaluate whether or not the applicable region 20 is an initialization point (Step 200). If the applicable region 20 at this point is not an initialization point (Step 200: NO), the evaluation processing portion 46 changes the user level of the user ID, in the user level storing portion 4413, to a value that equals the region level of the given region 20 (Step 104), and the series of entry evaluating processes is terminated. Doing so changes the user level to a level that is equal to the region level of the region 20 into which the user entered, and thus, thereafter, in the evaluation of an entry into another region, entry into a region of a higher region levels than that of the region 20 is prohibited.

On the other hand, if the applicable region 20 at this point is an initialization point (Step 200: YES), the user level of the user, in the user level storing portion 44B, is changed level 0, indicating the non-controlled level (Step 201), and the series of entry evaluating processes is terminated. Doing so changes the user level to the non-controlled level, so that, thereafter, in entry evaluations into other regions, the evaluation will be that entry is authorized into all regions 20.

Figure 8:
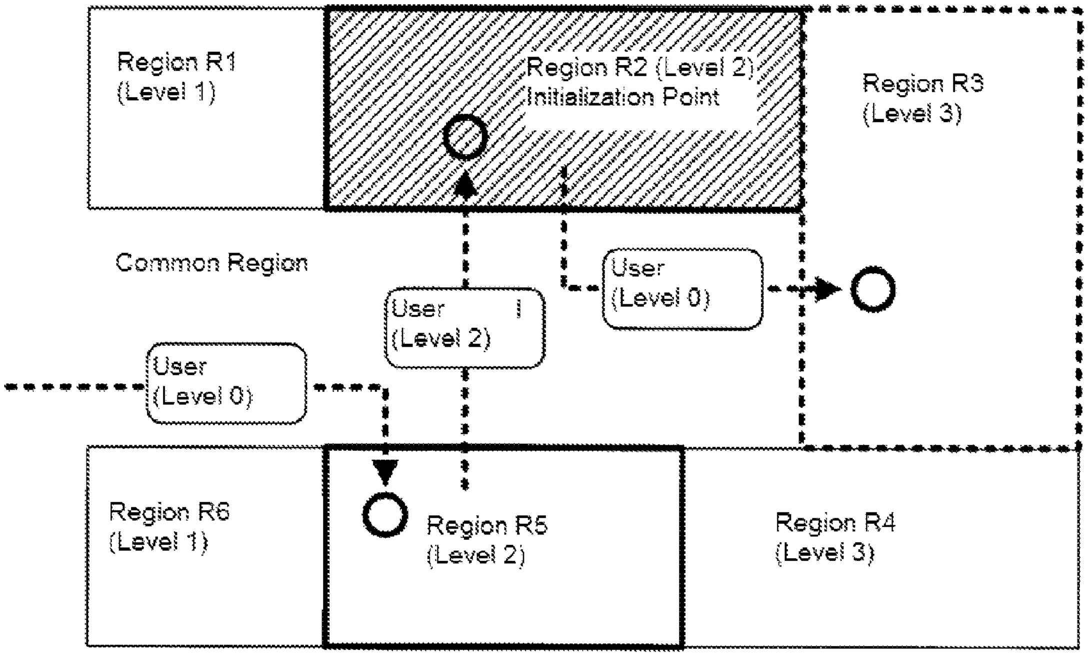
FIG. 8 is an explanatory diagram illustrating an example entry evaluation operation of the facilities controlling system according to the other example.

An example of the entry evaluation operations of the facilities controlling system according to the present example is explained next in reference to FIG. 8. FIG. 8 is an explanatory diagram illustrating an example of the entry evaluation operation of the facilities controlling system according to this example.

In the example in FIG. 8, six regions 20, comprising regions R1 through R6, are provided within the facility, in contact with a common region. As is illustrated in FIG. 2, described above, these regions R1 through R6 are provided in advance with region levels, where level 1 is set for regions R1 and R6, level 2 is set for regions R2 and R5, and level 3 is set for regions R3 and R4.

A case of a user entering into region R2 and then into region R3 after having entered into the region R5 from the common region is explained here. Because, at this time, in order to prohibit entry into the region R3 of a user that has exited the region R5, the region level of the region R3 is set to a higher-level, 3, than the region level 2 of the region R5. Moreover, so that a user that has exited the region R5 can enter into the region R2, the region level of the region R2 is set to the same level as that of the region R5, that being level 2.

First, in the state before entering into the region R5, if the user level of the user is initialized to level 0, which is the non-controlled level, then the evaluation is that entry is authorized in the evaluation of entry into region R5. This enables the user to enter into region R5. Additionally, in accordance with the entrance into this region R5, the user level of the user is changed from level 0 to level 2, which is the region level of the region R5.

Consequently, when the user exits from the region R5 into the common region and then attempts to enter into the region R2, the user level of the user has been changed to level 2, but because this is equal to the region level of the region R2, entry of the user into the region R2 is permitted. Additionally, in accordance with the entrance into this region R2, the user level of the user is initialized from level 2 to level 0, which is the non-controlled level.

Thereafter, when the user exits from the region R2 into the common region and then attempts to enter into the region R3, the user level of the user has been changed to level 0, and thus entry into the region R3 is permitted.

In this way, in the present example if in the evaluation processing portion, the evaluation result indicates entry authorization, and if the region 20 is the initialization point, then the user level for the user is changed to the non-controlled level in the user level storing portion 44B, thus making it possible to initialize the user level of the user in accordance with the route of the user.

Doing so makes it possible to change the authorization for entry into a controlled region, for which user entry is limited, in accordance with whether or not the user has entered into a particular region or into an initialization point, making it possible to achieve extremely flexible entry evaluations.

Consequently, in the example in FIG. 8, if region R5 is a special region that is a biological laboratory that handles special organisms, or a radiation room that handles radiation, or the like, region R3 is a controlled region wherein entry of users is controlled, and region and R2 is an initialization point, then those users who have not entered into the special region can be authorized to enter into the controlled region, those users who have entered into the special region can be prohibited from entering into the controlled region, and those users who have entered into the initialization point after entering into the special region can be permitted to enter into the controlled region. Doing so makes it possible to permit entry into controlled regions for only those users who have first passed through a clean room or a security room.

Moreover, while in the present example the explanation was for a case wherein one or more initialization points is provided in the regions that are controlled, the initialization point need not necessarily be a specific region, but, for example, may be assigned to one reader terminal 22 that is provided in the common region.

While the present invention was explained above in reference to forms of embodiment, the present invention is not limited by the forms of embodiment set forth above. The structures and details of the present invention may be modified in a variety of ways, as can be understood by those skilled in the art, within the scope of the present invention.

The invention claimed is:

1. A facilities controlling system for performing an entrance authorization evaluation for a user into a region by comparing a region level, which indicates the level of security for a region that is provided in the facility, and a user level, which indicates the level of security for a user that uses the region, comprising:

a region level storing portion storing a region level for each region for which entry is controlled;

a user level storing portion storing a user level for each user that uses the region;

a reader terminal, provided in each region, sending an evaluation request for requesting an entry authorization evaluation for the user for the region in response to a user operation; and an evaluation processing portion evaluating entry authorization of the user for the region, through comparing, in response to an evaluation request from a reader terminal, the region level of the region, obtained from the region level storing portion, and the user level of the user, obtained from the user level storing portion, and directing, based on the evaluation result, the locking or unlocking of an electric lock that is provided at the region, wherein:

the evaluation processing portion changes the user level of the user, in the user level storing portion, to a value that is equal to the region level when the evaluation result indicates that entry is authorized;

the region level storing portion stores, in advance, an initialization point, among the regions, wherein the user level of the user is changed to a non-controlled level; and the evaluation processing portion evaluates, at the time of entrance, that entrance into all regions is authorized if the user level is the non-controlled level, and changes the user level of the user, in the user level storing potation, to the non-controlled level if the evaluation result is that entry is authorized and the region is an initialization point.

2. A facilities controlling method used in a facilities controlling system for performing an entrance authorization evaluation for a user into a region by comparing a region level, which indicates the level of security for a region that is provided in the facility, and a user level, which indicates the level of security for a user that uses the region, comprising:

a region level storing step storing, in a region level storing portion, a region level for each region for which entry is controlled;

a user level storing step storing, in a user level storing portion, a user level for each user who uses the region;

an operating step sending, using a reader terminal provided in each region, an evaluation request requesting an entry, authorization evaluation for the user for the region in response to a user operation; and an evaluation processing step evaluating, using an evaluation processing portion, the entry authorization of the user for the region, through comparing, in response to an evaluation request from a reader terminal, the region level of the region, obtained from the region level storing portion, and the user level of the user, obtained from the user level storing portion, and directing based on the evaluation result, the locking or unlocking of an electric lock that is provided at the region, and changing, at the evaluation processing portion, the user level of the user in the user level storing portion to a value that is equal to the region level when the evaluation result indicates that entry is authorized; and the region level storing step includes storing, in advance, an initialization point, among the regions, wherein the user level of the user is changed to a non-controlled level; and the evaluation processing step includes evaluating, at the time of entrance, that entrance into all regions is authorized if the user level is the non-controlled level, and changing the user level of the user, in the user level storing portion, to the non-controlled level if the evaluation result is that entry is authorized and the region is an initialization point.

* * * * *